United States Patent [19]

Brown

[11] Patent Number: 5,010,973
[45] Date of Patent: Apr. 30, 1991

[54] FREIGHT CARRIER

[76] Inventor: Philip A. Brown, 4689 - 8 Mile Rd., NW., Conklin, Mich. 49403

[21] Appl. No.: 400,662

[22] Filed: Aug. 31, 1989

[51] Int. Cl.⁵ ............................................. B60P 1/02
[52] U.S. Cl. ................................... 180/213; 180/350; 474/158; 414/474
[58] Field of Search ............... 180/213, 212, 211, 373, 180/357, 350, 366; 414/474, 476, 495; 474/158, 160

[56] References Cited

U.S. PATENT DOCUMENTS

| | | | |
|---|---|---|---|
| 2,659,220 | 11/1953 | Cherry | 474/158 |
| 4,122,963 | 10/1978 | Berglund | 414/474 |
| 4,126,198 | 11/1978 | Martin | 180/213 |

FOREIGN PATENT DOCUMENTS

| | | | |
|---|---|---|---|
| 486283 | 9/1952 | Canada | 180/213 |
| 0881798 | 5/1943 | France | 180/373 |
| 2469339 | 5/1981 | France | 180/213 |
| 426063 | 3/1935 | United Kingdom | 180/213 |

Primary Examiner—Charles A. Marmor
Assistant Examiner—Victor E. Johnson
Attorney, Agent, or Firm—Waters & Morse

[57] ABSTRACT

A three-wheeled freight-carrying vehicle has a platform section with coaxial driving wheels, and a power section at the opposite end driving a steerable single wheel. An operator's platform is provided at the side of the single wheel. The single wheel and the platform section wheels are vertically adjustable with respect to the platform section.

1 Claim, 4 Drawing Sheets

FREIGHT CARRIER

BACKGROUND OF THE INVENTION

This invention provides a self-powered freight-carrying vehicle. The unit is intended to replace the usual combination of a farm tractor and a flat-bed trailer for certain operations. These two are normally coupled together with a standard hitch that provides relative articulation about a vertical axis. The tractor is a separate controllable vehicle on its own, and designed to accommodate a wide variety of other uses. Maneuverability of the combination of the tractor and the trailer in close quarters is quite limited. In agricultural operations in orchards, this factor is critical. Trees are closely planted, and must not be subject to damage by moving equipment. It should also be noted that a standard farm tractor is a substantial investment, and represents a capacity to perform functions that often are needed at the same time that the freight-carrying operation is underway. Where a considerable amount of the freight-carrying function is needed, the usual tractor can be freed for other work by a much simpler machine at a correspondingly lower cost.

SUMMARY OF THE INVENTION

This invention provides an integrated load-carrying vehicle that includes a platform section with at least a pair of coaxial wheels, and a power section with a motor and steerable single drive wheel. The motor preferably operates a hydraulic pump, and the wheel has its own hydraulic motor. The wheel is centrally mounted along the projected axis of the platform section, and the two sections are relatively adjustable vertically. An operator's station is located at the side of the drive wheel. Hydraulic lines also connect the pump to a hydraulic system controlling the vertical positioning of the platform section with respect to its wheels, and to a separate drive for these wheels. The drive to these wheels incorporates a sprocket secured to each of the wheels by the usual mounting bolts, and a double chain with one side closely surrounding these sprockets. The overhanging other side of the chain is engaged by a driving sprocket on a hydraulic motor secured to the spindle structure on which the wheel is supported.

DESCRIPTION OF THE PREFERRED EMBODIMENT

Figure 3:
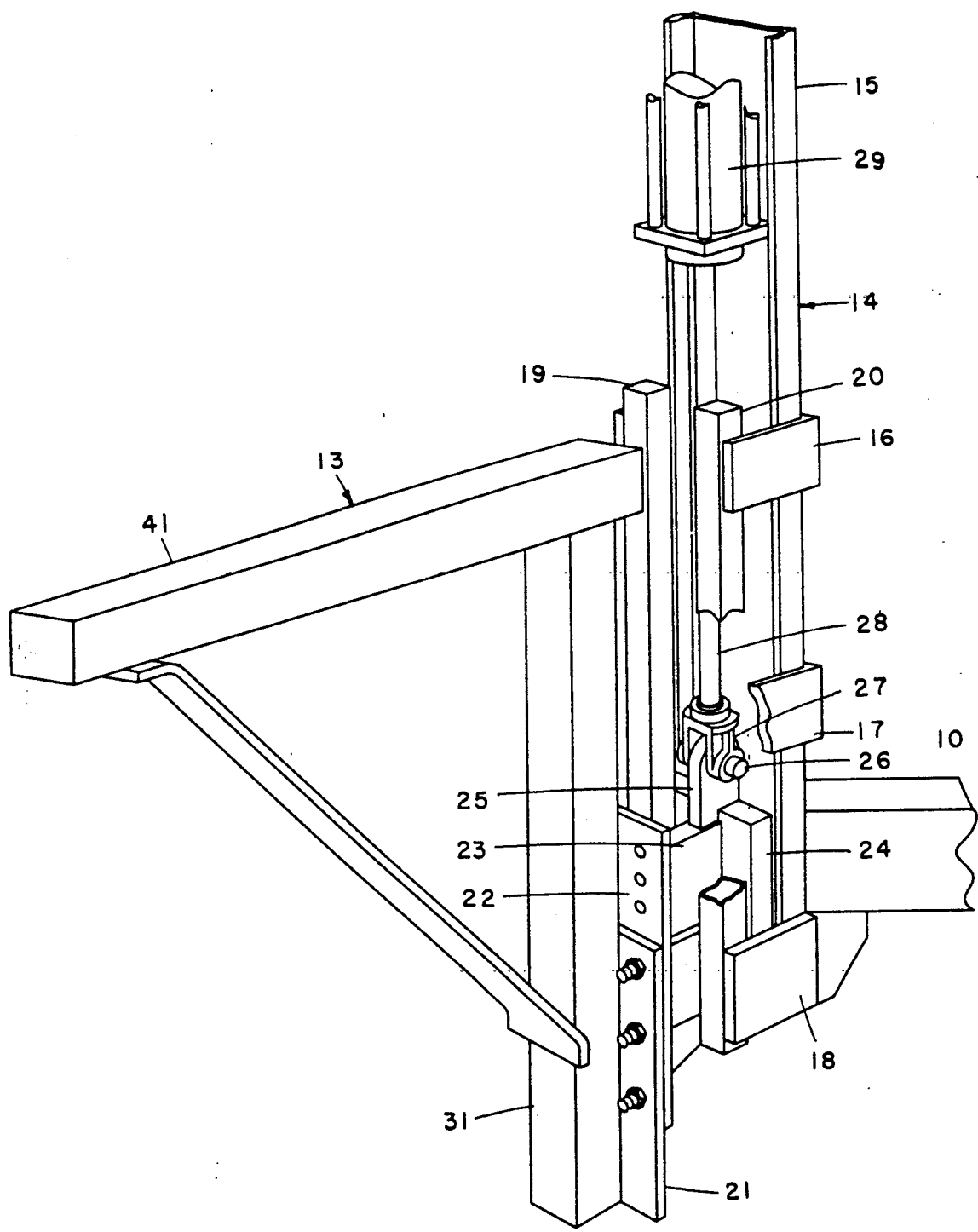
FIG. 3 is a fragmentary perspective view showing the system for vertically adjusting the platform section with respect to steerable traction unit.
Figure 4:
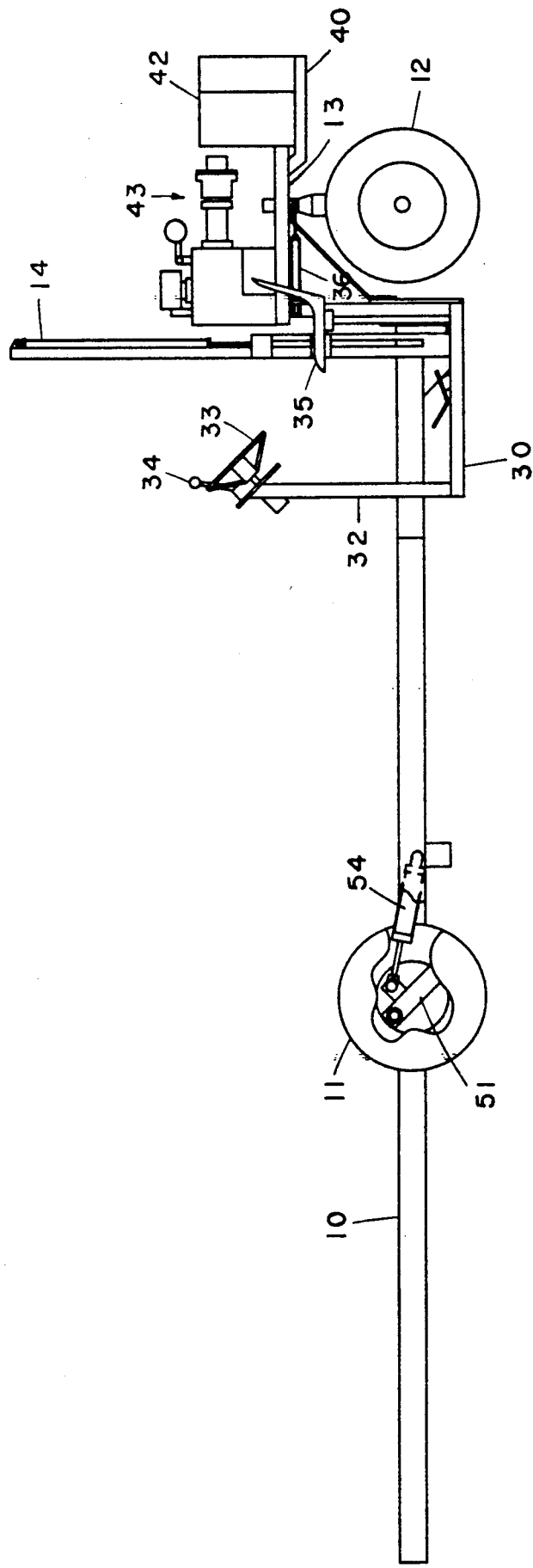
FIG. 4 is a side elevation showing the complete vehicle.

Referring to FIG. 4, the complete vehicle includes a platform section 10 with wheels on each side as shown at 11. A steerable drive wheel 12 is mounted on a L-shaped frame 13, which is positioned vertically by the guideway structure 14 secured to the platform section 10. Referring to FIG. 3, this guideway structure includes the channel 15 with spacing plates as shown at 16-18 welded on each side for positioning the bars 19 and 20. The L-frame 13 has a flange plate 21 which can be bolted to a mating flange plate 22 welded to the follower block 23. The two flange plates can be bolted together in any one of several relative positions to establish an initial vertical relationship between the steerable unit and the platform section. The follower block 23 has welded side blocks as shown at 24 that are slidably received between the bars 19-20 and the back of the channel 15. Lateral confinement is provided by the flanges of the channel 15. The follower also has a tongue 25 engaged by the bolt 26 that traverses the fork 27 secured to the lower extremity of the piston rod 28 associated with the hydraulic cylinder 29 secured to the channel 15. The various hydraulic lines associating the cylinder and the other hydraulic components are omitted from the drawings for clarity.

Figure 1:
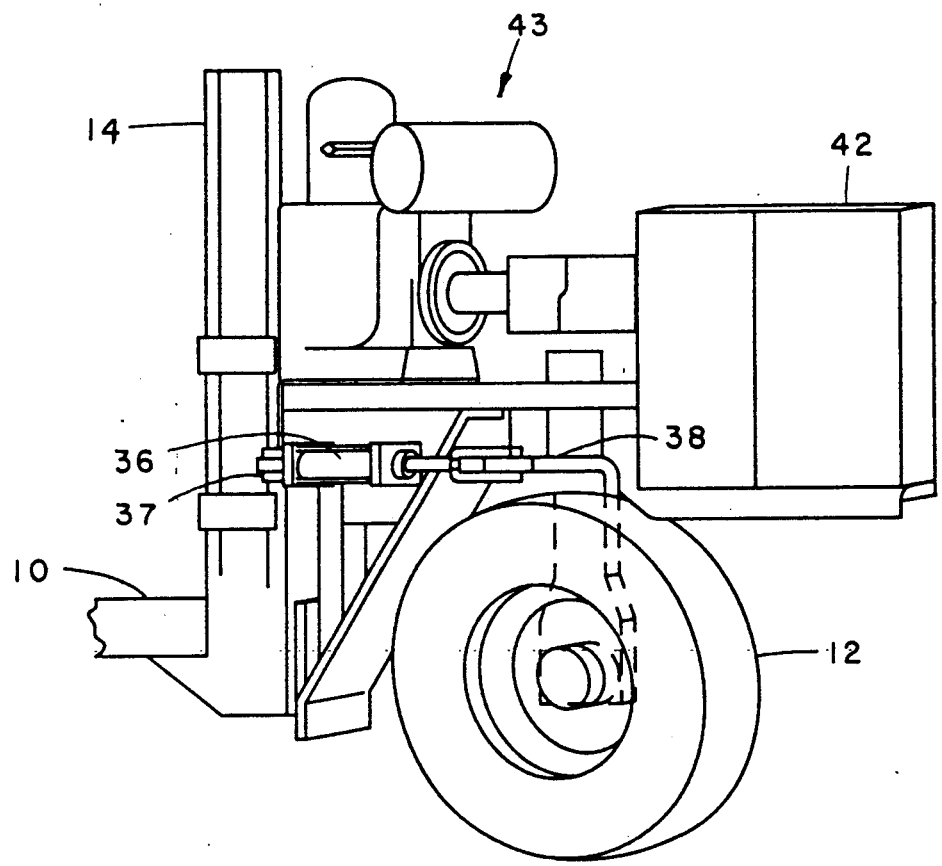
FIG. 1 is a perspective view of the steerable traction unit.
Figure 2:
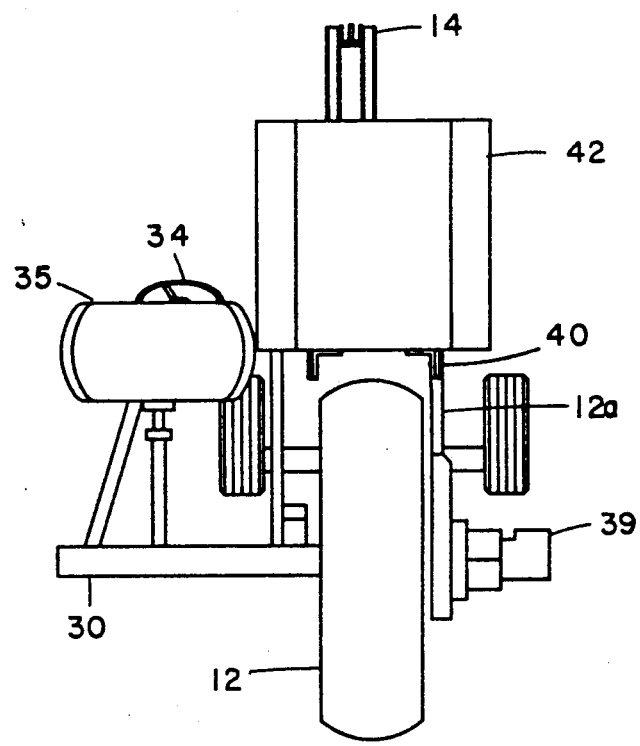
FIG. 2 is an end elevation of the structure shown in FIG. 1.

Referring to FIGS. 1, 2, and 4, the footrest platform 30 is welded to the lower extremity of the vertical member 31 (see FIG. 3) of the L-frame 13. It extends to one side of the wheel 12, which is located near the projected centerline of the platform section 10. A column 32 is secured at the opposite end of the platform 30, and supports a steering wheel 33 and a set of controls 34 associated with the hydraulic system. An operator's seat 35 completes the operator's station. It should be noted that the platform 30 is normally quite close to the ground, and the operator's seat is thus much more easily entered than is the seat of a standard tractor. As this maneuver is often done every few minutes, the decrease in fatigue of the operator is significant. The steering wheel 33 controls the hydraulic cylinder 36, which extends between the bracket 37 on the vertical member 31 of L-frame and the steering arm 38 associated with the wheel 12. Drive for the steerable traction wheel 12 is provided by the hydraulic motor 39 mounted on the wheel strut 12a. A short horizontal beam 40 extends from the horizontal member 41 of the L-frame 13, and supports the tank 42. A conventional gasoline engine installation generally indicated at 43 operates the hydraulic pump (not shown) to provide pressure for the system.

Figure 5:
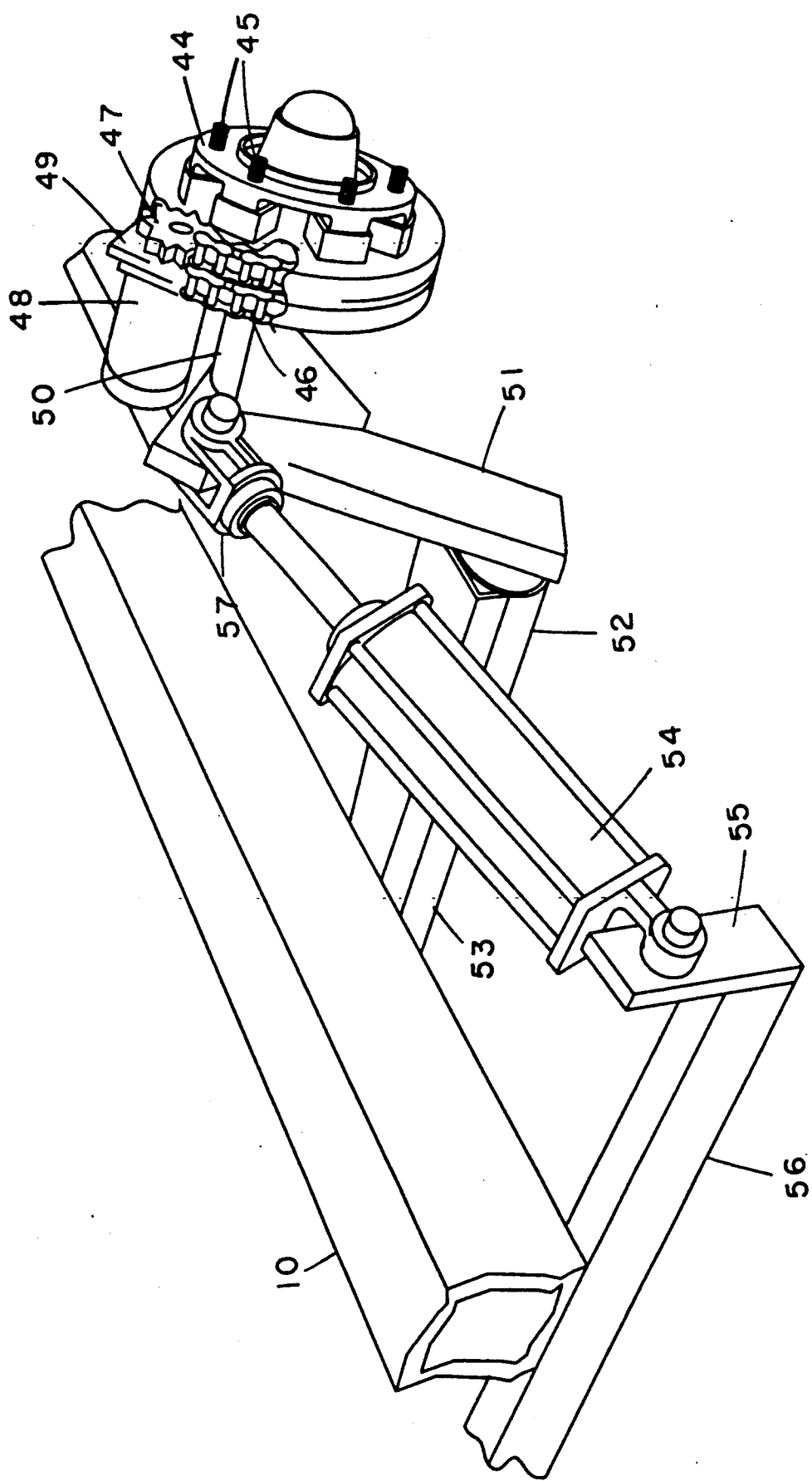
FIG. 5 is a fragmentary perspective view on an enlarged scale showing the driving system for the platform section of the vehicle, and its vertical adjustment.

Referring to FIG. 5, a sprocket is bolted to the inside face of the hub 44 by the same bolts 45 that secure the wheels 11 in position. The usual studs of the hub are removed, and the holes drilled out to receive bolts traversing the sprocket and hub. A double chain 46 has its right-hand section, as viewed in FIG. 5, in engagement with the entire periphery of this sprocket. The left section of the chain, which is integral with the right section, overhangs the driven sprocket on the inside, and is engaged by the driving sprocket 47 of the hydraulic motor 48 laterally opposite the driven sprocket. This motor is carried by the plate 49 that is fixed with respect to the spindle 50 on which the hub 44 is mounted. The spindle is secured to the end of the radius arm 51 rotatably mounted in the bearing 52 on the beam 53 secured to the platform structure 10. The hydraulic cylinder 54 extends from the bracket 55 of the transverse beam 56, also welded to the platform 10. The fork 57 at the opposite end of the cylinder assembly is pivotally connected to the arm 51, and actuation of the cylinder 54 will have the effect of raising or lowering the wheel carried by the spindle 50. Regardless of its vertical position with respect to the platform structure 10, the wheel will continue to be driven by the hydraulic motor 48. This drive system and vertical adjustability is controllable from the operator's station.

I claim:

1. A load-carrying vehicle, comprising:
   a load-carrying platform section having wheel means;
   a power section coupled to said platform section in fixed relationship with respect to relative rotation about a vertical axis, said power section including steerable drive wheel means and motor means adapted to rotate said drive wheel means;
   means forming an operator's station including a footrest platform mounted on said power section adjacent ground level and laterally offset from a portion of said platform and from said drive wheel means; and
   wherein said load-carrying platform section wheel means is vertically adjustable with respect to said load-carrying platform section, and is provided with drive means energized by said motor means, said platform section wheel drive means including spindle means and a wheel sprocket secured to at least one wheel rotatably mounted on said spindle, and also including a double chain having two sides, one side thereof being in fixed engagement with said wheel sprocket, and further including motor means having a driving sprocket laterally opposite said wheel sprocket, and rotatable on an axis adjacent and displaced from said wheel sprocket axis of rotation in engagement with the other of said two sides of said double chain, said letter motor means being mounted on a member fixed with respect to said spindle.

* * * * *